United States Patent [19]
Aamodt

[11] Patent Number: 5,435,592
[45] Date of Patent: Jul. 25, 1995

[54] TORQUE ABSORBING SUSPENSION ARM

[76] Inventor: James H. Aamodt, 3224 Fairchild Ave., Wayzata, Minn. 55391

[21] Appl. No.: 122,042

[22] Filed: Sep. 14, 1993

Related U.S. Application Data

[63] Continuation-in-part of Ser. No. 862,529, Apr. 2, 1992, abandoned.

[51] Int. Cl.⁶ .................... B60G 11/26; B60G 11/64
[52] U.S. Cl. .................................. 280/704; 280/723
[58] Field of Search ............... 280/704, 711, 717, 721, 280/723, 725, 709; 267/154, 273

[56] References Cited

U.S. PATENT DOCUMENTS

| | | |
|---|---|---|
| 2,919,126 | 12/1959 | Loehr . |
| 2,983,505 | 4/1957 | Hanslip . |
| 3,436,069 | 4/1969 | Henschen . |
| 3,617,072 | 11/1971 | Turner . |
| 3,737,174 | 6/1973 | Hickman . |
| 3,779,576 | 12/1973 | Malcolm . |
| 3,782,753 | 1/1974 | Sweet et al. . |
| 3,794,344 | 2/1974 | Raidel . |
| 3,802,718 | 4/1974 | Schaeff . |
| 3,831,210 | 8/1974 | Ow . |
| 3,961,826 | 6/1976 | Sweet et al. . |
| 3,976,302 | 8/1976 | Hammarstrand . |
| 4,089,544 | 5/1978 | Raidel . |
| 4,166,640 | 9/1979 | Van Denberg . |
| 4,792,148 | 12/1988 | Hintz . |
| 4,881,747 | 11/1989 | Raidel . |
| 5,230,528 | 7/1993 | Van Raden et al. ........ 280/704 |

FOREIGN PATENT DOCUMENTS 0376834  7/1990
2582996 12/1986  France .

OTHER PUBLICATIONS

Watson Suspension Systems, "WCAL—2200 Series", outstanding features and detail parts, Apr. 19, 1990.
Watson Suspension Systems, "WCAL—1100 Series Parallelogram Self Steering Systems", Apr. 19, 1990.

*Primary Examiner*—Brian L. Johnson
*Attorney, Agent, or Firm*—Patterson & Keough

[57] ABSTRACT

A suspension system for an auxiliary axle of a vehicle. The suspension system supports an axle of a vehicle having a vehicle frame. The axle has a wheel set at either end and is disposed beneath the vehicle frame. The suspension system comprises a trailing arm having a leading portion pivotally coupled to the vehicle frame and having a trailing portion. Additionally, a bracket for coupling the axle to the trailing arm is fixedly coupled to the axle and pivotally coupled to the trailing portion of the trailing arm. The suspension system further includes a spring mechanism for supporting the vehicle above the axle and for providing compliance to permit axle motion relative to the vehicle. The spring mechanism is disposed generally outboard of the vehicle frame and supported by a first flange coupled to the trailing arm and a second flange coupled to the vehicle frame.

6 Claims, 3 Drawing Sheets

TORQUE ABSORBING SUSPENSION ARM

This is a Continuation-in-Part of U.S. Patent application Ser. No. 07/862,529, filed Apr. 2, 1992 now abandoned.

TECHNICAL FIELD

This invention relates to a suspension system for use with an auxiliary, unpowered rear axle having a wheel set at both ends of the axle used on heavily leaden vehicles such as trucks and trailers, and especially for use by such trucks and trailers operated on uneven road and ground surfaces. More specifically, the suspension system includes apparatus to absorb the torque that is generated as the suspension system is unevenly compressed and extended in relation to the vehicle frame responsive to the wheel sets at each end of the axle operating over uneven ground surfaces.

BACKGROUND OF THE INVENTION

Presently, there are many suspension systems manufactured for use with auxiliary axles on trucks and trailers. Such axles are of the type that is alternately drawn up beneath the vehicle at times when the vehicle is lightly loaded so that the wheel sets carried by the axle are not in contact with the ground surface beneath the vehicle. The axles may then be selectively pivoted downward to engage the wheel sets with the ground surface to assist in supporting the vehicle when the vehicle is heavily laden. Virtually all of these suspension systems incorporate a trailing support arm anchored at the leading end to the vehicle frame with the auxiliary axle mounted at the trailing end. The trailing arm is pivotable about the leading end, such that the auxiliary axle may be drawn up beneath the vehicle frame and may be lowered to the surface beneath the vehicle as desired. Typically, the springing support utilized to control the axle of the existing systems has been mounted between the auxiliary axle and the underside of the vehicle frame to support and control the auxiliary axle.

The designs of existing suspension systems are built on the assumption that the surface over which the vehicle will be operating is essentially a smooth surface. The designs assume that the up and down motion of the wheel sets on either end of the auxiliary axle will be generally in unison. Suspension systems of this type are typified by the suspension system claimed in U.S. Pat. No. 4,881,747 to Raidel. The Raidel suspension system functions around two torque tubes that form a parallelogram at the suspension points of each of the pair of wheels. The parallelogram allows for motion only in the vertical plane defined by the parallelogram.

No provision is made in the Raidel design and other designs for the torque that is induced in the suspension system as a result of operating over uneven surfaces, where the rolling motion of the axle causes the wheel set on one end of the axle to be compressed in its full upward position while the wheel set on the other end of the axle is at its fully extended position. This results in the torque being transmitted to the axle suspension system itself and ultimately to the frame of the vehicle. Since there is virtually no compliance designed into the existing systems to accommodate rotational forces induced by the vehicle operating over greatly uneven surfaces, the suspension system and the frame must be substantially strengthened in order to absorb the very substantial torque moments generated by such motion of the heavily laden vehicle. Such strengthening has been by using a double channel frame or increasing the depth of the frame.

Such torques are transmitted as a bending torque and are borne by the suspension components and the frame itself. Over time such torques induce failures in the suspension system and in the frame itself. The existing solutions to alleviate vehicle chassis and suspension component breakage due to torque stress have been simply to make these components heavier and larger. Heavier components only prolong the time until failure occurs and add unneeded weight and additional costs to the vehicle. When breakage due to such torques ultimately does occur, it adds to the maintenance required by the vehicle.

There is a need to achieve more capability for commercial vehicles to operate over uneven and off-road surfaces, such as at construction sites and the like. The auxiliary axles needed to provide this additional load carrying capability over such surfaces should be low cost. Additionally, the design of the axles should minimize the weight of the axles and associated suspension system in order to maximize the payload of the vehicle. A suspension mechanism to absorb the bending torques would meet these objects. To date, no existing suspension which is used in conjunction with a solid beam axle has any mechanical features designed to absorb the torsion that is induced by the uneven raising and lowering of the sets of wheels as a function of operation over uneven surfaces.

Another concern, especially for off-road use, is the height above the ground that the auxiliary axle is able to be retracted to. Current suspensions and recent deeper reinforced truck frames have steadily reduced the available vertical lift for a retracted auxiliary axle. The lift height is important to clear irregular obstacles when a vehicle is driven off of a finished surfaced road. Current auxiliary axle suspension systems exacerbate the problem of vertical lift by interposing the springing means between the frame and the trailing arm. Currently, to achieve proper lift height on a typical on-off highway heavy truck, a chassis frame of no more than eleven inches in vertical height must be utilized. Due to this height restraint of the frame rails and to achieve proper lift, the frame rail most often must be made of heavy double rail or of channel design to resist the twisting that is imposed by the uneven compression and extension of the wheel sets on either end of the auxiliary axle.

In view of the foregoing, it is an objective of the present invention to absorb the torque generated by uneven motion of the wheel sets.

It is a further objective of the present invention to be able to provide a given measure of weight bearing capability while utilizing a lighter weight chassis frame.

It is yet another objective of the present invention to increase the lift height of the auxiliary axle when in the retracted position.

It is a further objective of the present invention to minimize wear and breakage of the frame and auxiliary axle suspension system due to bending and torque transfer as a result of the uneven compression and extension of the wheel sets at either end of the auxiliary axle.

SUMMARY OF THE INVENTION

The present invention greatly reduces frame fatigue, as well as suspension system component loosening and failure induced by operations over uneven road surfaces, by substantially eliminating torsion to the suspension system and the frame of the vehicle. This allows the present invention to be manufactured with fewer moving parts, lighter weight, and lower production costs. Service costs are also reduced due to the inventive design having fewer moving parts than conventional designs. Additionally, the invention, by locating the suspension components out board of the vehicle frame, places the suspension system closer to the wheel sets for better and safer control of the motion of the wheel sets. This location enhances the quality of ride that the auxiliary axle provides. Further, this location permits the auxiliary axle to be drawn up closer beneath the vehicle frame when not in use, thereby enhancing the vehicle's ability to clear obstacles.

The present invention incorporates two major features in the auxiliary axle suspension system that make the suspension system suitable for use on heavily leaden vehicles operating on uneven surfaces in off road conditions. These features function to absorb the rotational torque produced by the uneven up and down motion of the wheel sets of either end of the auxiliary axle as a function of the uneven surface over which the vehicle is operating, and provide for increased vertical lift of the auxiliary axle when in the retracted position. The first of such features is a design of the trailing suspension arm that accommodates rotation of the axillary axle within the suspension system without inducing a rotational torque in the trailing suspension arm or in the vehicle frame to which the trailing suspension arm is affixed. Since there is virtually no torque absorption in the components of a suspension system for the auxiliary axle and no torque is transmitted to the vehicle frame, both the various components of the suspension system and the frame can be of lighter construction for a given load-bearing in capacity, and yet provide safe, reliable, maintenance-free service.

The second main feature of the auxiliary axle suspension system is that it is mounted outboard of the frame of the vehicle. The advantage of such mounting is that the springing support can be mounted at a greater height with respect to the frame, thereby greatly increasing the available lift height of the auxiliary axle when in the retracted position. This acts to increase the ground clearance of the vehicle such that the vehicle is able to operate over more uneven ground without getting hungup on obstacles.

The suspension system of the present invention incorporates a single trailing arm of fixed length. The trailing arm is mounted outboard of the frame on either side of the vehicle and trails rearward from the connection point in both the retracted, stored position and the extended, load bearing position. The trailing arm is pivotally mounted at its leading end such that it pivots in an arc that forms a plane generally parallel to the vertical plane formed by the side of the associated frame of the vehicle. The pivot mount at the leading edge of the trailing arm contains a flexible bushing that accommodates slight motion of the trailing arm out of the previously described parallel plane. Such motion is caused by rotation of the auxiliary axle responsive to uneven surfaces over which the vehicle is traveling.

Connections are provided proximate the trailing end of the trailing arm to support the auxiliary axle beneath the trailing arm and to connect a springing support mechanism above the trailing arm. The springing support mechanism is disposed between a flange attached to and outboard of the vehicle frame and a second flange that is mounted above the axle, such that the spring mechanism is located adjacent to the frame as opposed to beneath the frame in present designs.

Uniquely, the trailing arm is comprised of a concentric tube and bar. The tube comprises the leading end of the trailing arm and provides support for mounting the flange that bears the spring mechanism. By thus mounting the spring mechanism, the spring mechanism is not subjected to the rotational forces that are induced as a result of axle rotation beneath the frame.

The bar is concentric with the tube and is slid a substantial distance into the tube in order to provide structural support for the bar. The bar is necessarily of slightly less diameter than the tube, with the outer diameter of the bar being slightly less than the inner diameter of the tube. The bar is held rigidly within the tube as by weldments. The bar provides a rotatable mount for a bracket that in turn supports the axle.

The axle support bracket is provided to rotatably connect the auxiliary axle to the bar. The rotatable bracket is comprised of a short sleeve section of tubing of the same inside and outside diameters as the tube of the trailing support arm. A flange is affixed to the exterior of the tube section as by a weldment. The tube section of the flange comprises a sleeve when slid over the bar of the trailing support arm. Lubrication ports are provided in the tube section to make sure that tube section is free to rotate about the second tube portion of the trailing arm. The flange portion is firmly affixed to the axle beam of the auxiliary axle as by U-bolts or the like. By so mounting the auxiliary axle to the trailing support arm, rotational forces generated by the auxiliary axle simply rotate the axle supporting bracket around the second tube of the trailing arm as opposed to transmitting torsional forces through the trailing arm and the auxiliary axle support to the frame of the vehicle.

DETAILED DESCRIPTION OF THE DRAWINGS

Figure 1:
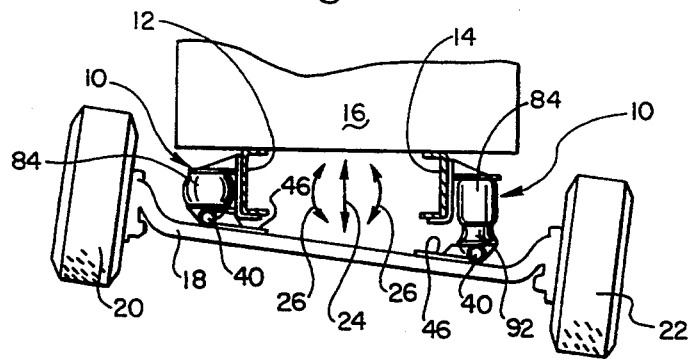
FIG. 1 is a perspective view of the torque absorbing suspension arm in accordance with the present invention with the arrows depicting the motion induced in the support arm by motion of the axle over an uneven ground surface.

Two auxiliary axle suspension systems are depicted in FIG. 1 generally at 10. The left hand and right hand auxiliary axle suspension systems 10 are mirror images of one another in order to accommodate being mounted outboard of left hand frame 12 and right hand frame 14 respectively. Vehicle frames 12, 14 are typically of channel steel and support a vehicle bed 16. Auxiliary axle 18 is a conventional beam axle supporting wheel sets 20, 22 on the left hand and right hand ends respectively of axle 18. Auxiliary axle 18 is an unpowered axle and is typically an add on item to a factory produced heavy vehicle. Axle 18 itself is frequently formed of a component that is intended to be a front axle of a heavy vehicle. As such, wheel sets 20, 22 may be free to castor or in an alternative embodiment may be fixed so that wheel sets 20, 22 do not "steer" as the vehicle turns.

FIG. 1 depicts the auxiliary axle 18 motion that the present invention is designed to accommodate. Auxiliary axle 18 must be free to translate in the vertical direction as indicated by arrows 24. Auxiliary axle 18 must also be free to rotate beneath vehicle bed 16 in a rolling motion responsive to vehicle operations over uneven surfaces. Such rotation is indicated by arrows 26 and has, as depicted in FIG. 1, resulted in compression of left suspension system 10 and extension of right suspension system 10.

Figure 2:
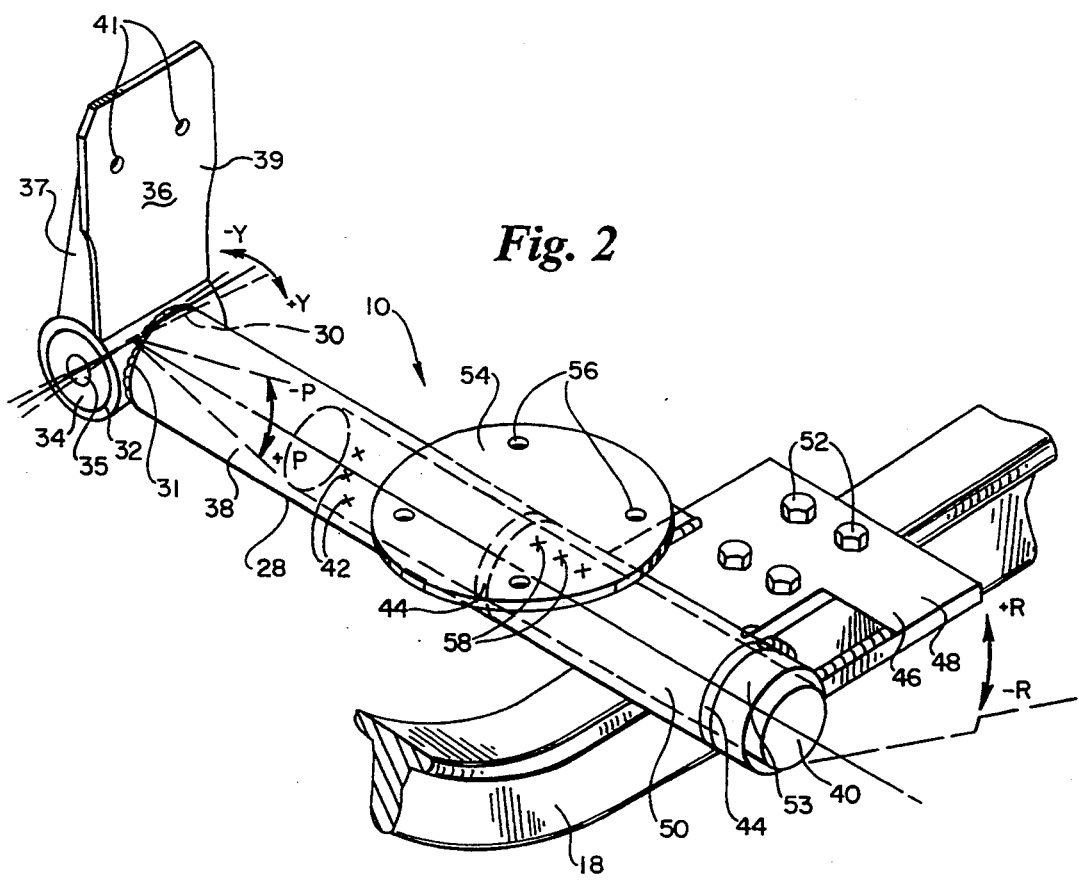
FIG. 2 is a rear elevational view of the auxiliary axle of a vehicle in the lowered position showing the effects of the vehicle operating on uneven ground where the lift suspension system is compressed and the right suspension system is extended.

Referring to FIG. 2, Suspension system 10 is shown oriented as the left suspension system 10 in the depiction of FIG. 1. Suspension system 10 has three major components; torque absorbing arm 28, lift plate 36, and axle connector 46.

Torque absorbing arm 28 is constructed of two concentric sections, leading tube 38 and trailing arm 40, shown partially in phantom in FIG. 2. Leading tube 38 has an outside diameter and an inside diameter and is constructed of high strength steel. Trailing arm 40 has an outside diameter that is slightly less than the inside diameter of leading tube 38, such that trailing arm 40 may be inserted into and is closely engaged with leading tube 38. Trailing arm 40 is affixed within leading tube 38 as by weldments 42.

Trailing arm 40 is a solid bar, constructed of high strength steel. Trailing arm 40 is of sufficient length such that it may be inserted within leading tube 38 a sufficient distance to provide adequate support and to project a substantial distance beyond the end of leading tube 38. The exterior surface of trailing arm 40 may be polished in order to minimize the generation of frictional forces between trailing arm 40 and devices that are in contact with trailing arm 40.

Figure 3:
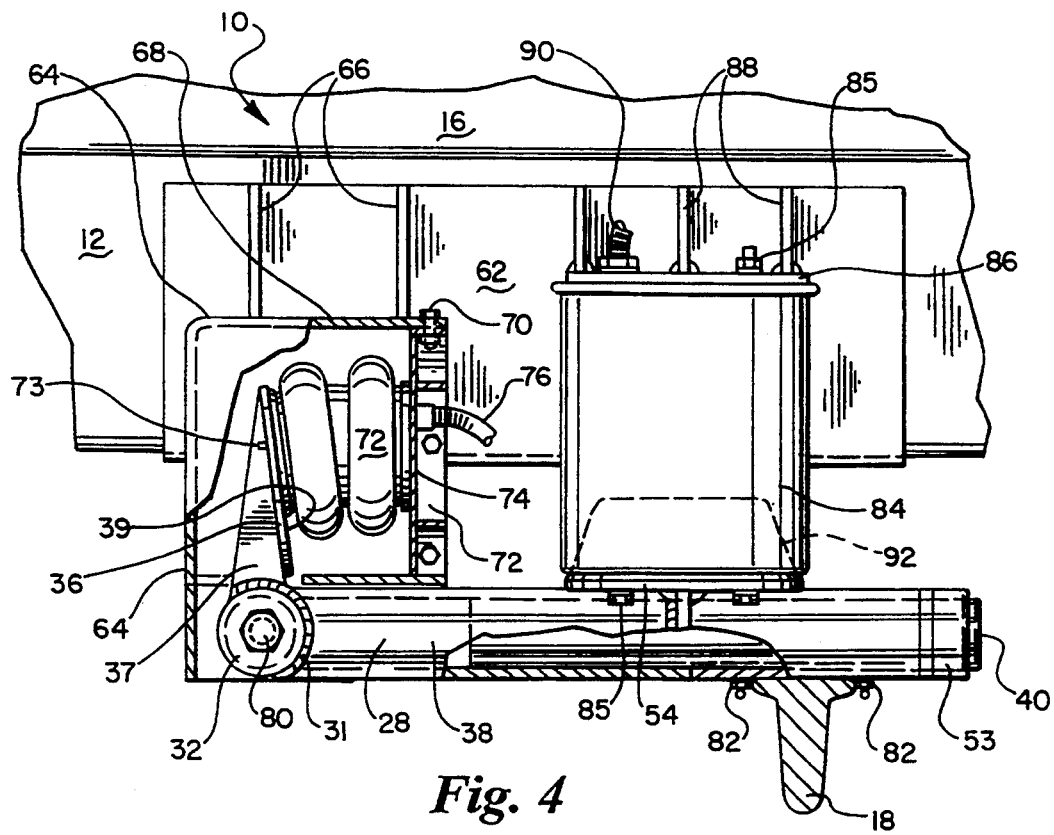
FIG. 3 is a side elevational view of the auxiliary axle suspension system affixed to the frame of the vehicle with a portion of the trailing arm support box broken away to reveal the air bag for raising and lowering the suspension system.
Figure 4:
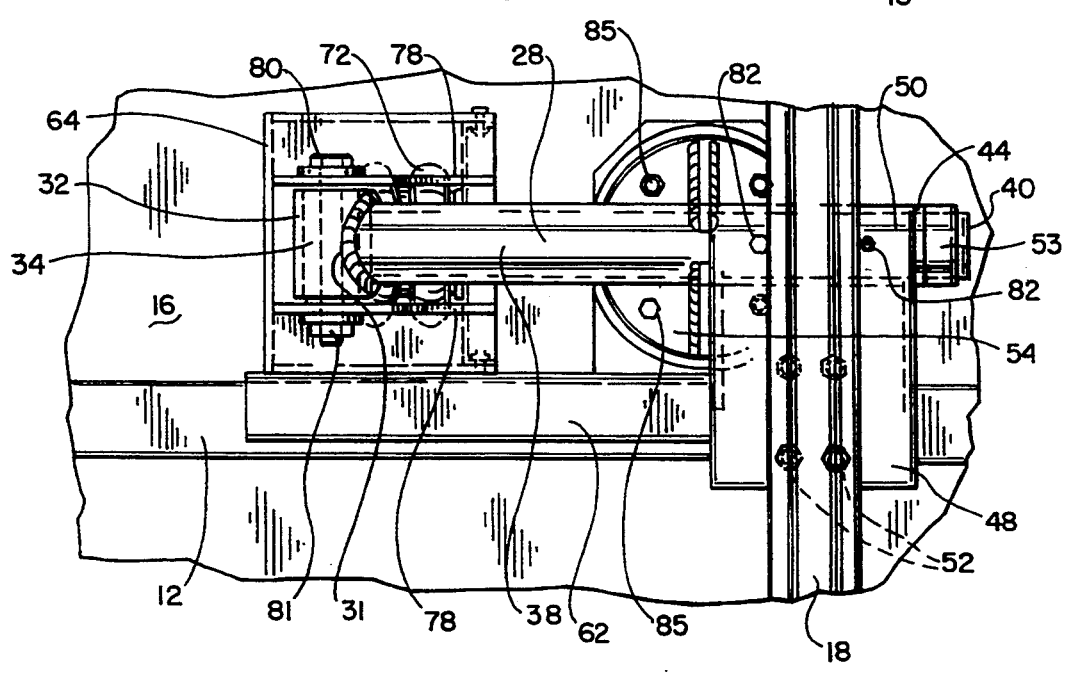
FIG. 4 is a bottom elevational view of the auxiliary axle suspension system affixed to the frame of the vehicle.

Leading tube 38 has a leading end 30 that is affixed as by weldments 31 to a sleeve 32. Sleeve 32 encloses a flexible bushing 34. Flexible bushing is preferably a commercially available compressed rubber bushing. Bushing 34 has an axial bore 35 therethrough to facilitate insertion of a mounting bolt 80, as depicted in FIGS. 3 and 4.

Lift plate 36 is affixed to the exterior of sleeve 32 as by weldments. Lift plate 36 includes gusset strengtheners 37. Lift plate 36 is designed to bear a load on face 39 and gusset strengtheners 37 assist in bearing that load. In the preferred embodiment, lift plate 36 generally forms a right angle with torque absorbing arm 28. Mounting bores 41 are provided in lift plate 36 to facilitate the mounting of devices to lift plate 36, as will be later detailed.

Axle connector 46 is comprised of two portions, bracket 48 and sleeve 50. Bracket 48 is a flat plate that is affixed to axle 18 as by bolts 52, which penetrate bores (not shown) in both bracket 52 and axle 18. Alternatively, U bolts or other suitable high strength fasteners may be used to affix bracket 48 to axle 18. Bracket 48 is constructed of high strength steel in order to provide an interface between axle 18 and suspension system 10 that is capable of bearing the loads of the heavily laden vehicle.

Sleeve 50 is welded to bracket 48. In the preferred embodiment, bracket 48 forms a tangential joint with the exterior surface of sleeve 50. Sleeve 50 is comprised of a tube section preferably having an exterior diameter and an interior diameter that are equal to the exterior diameter and interior diameter of leading tube 38. Sleeve 50 is slid over trailing arm 40 in rotational engagement therewith. At either end of sleeve 50, bushings 44 are provided to restrain the lengthwise motion of sleeve 50 on trailing arm 40 with minimal impairment of the rotational motion. Preferably, bushings 44 are free floating and are constructed of steel or bronze. Collar 53 is slid over the end of trailing arm 40 and is welded in place to trailing arm 40 as a retainer for bushings 44 and sleeve 50.

Air bag support plate 54 is welded to the top portion of sleeve 50 as by weldments at 58. Lower air bag support plate 54 is not affixed to trailing arm 40 nor to leading tube 38. Lower air bag support plate 54 is cantilevered over leading tube 38 and separated slightly therefrom in order to facilitate the rotation of leading tube 38 beneath lower air bag support plate 54. Bores 56 in lower air bag support plate 54 facilitate affixing the air bag 84 to lower air bag support plate 54, as depicted in FIGS. 3 and 4.

Figure 5:
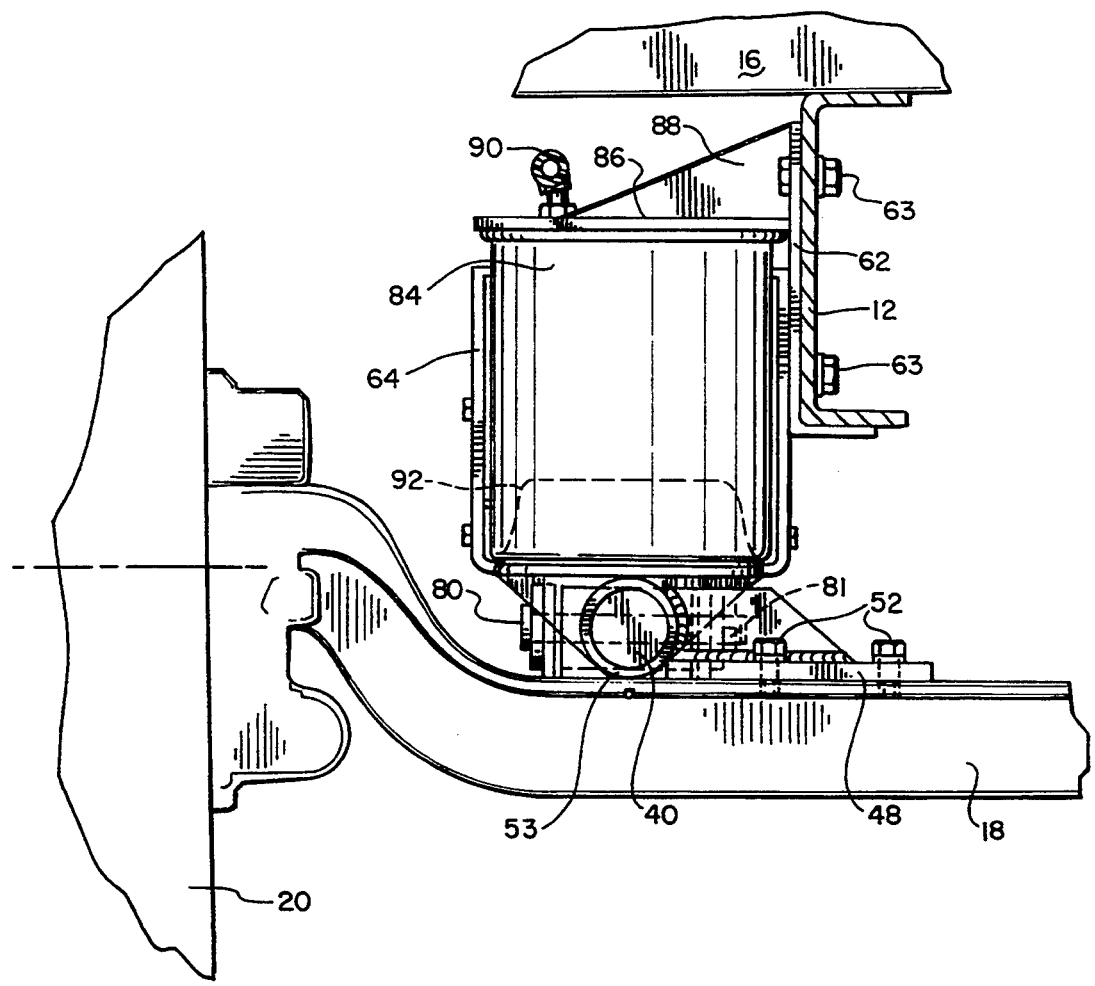
FIG. 5 is a rear elevational view of the auxiliary axle suspension system affixed to the frame of the vehicle.

Referring to FIG. 3, suspension system 10 is mounted to flat steel plate 62. Plate 62 is affixed to frame 12 by conventional means, which means may include bolts 63, as depicted in FIG. 5, and welding. Plate 62 is depicted affixed to the outboard portion of frame 12 such that suspension system 10 is carried outboard of frames 12, 14 as distinguished from being between or beneath frames 12, 14. Suspension system 10 is depicted in its fully retracted position with torque absorbing arm 28 generally parallel to frame 12. In this position the wheel set 20 supported by axle 18 is pulled up beneath frame 12 of the vehicle and the wheel set 20 is not in contact with the surface over which the vehicle is operating.

Box member 64 is a structural member providing support for the leading end of torque absorbing arm 28. Box member 64 is welded to plate 62 and is further strengthened by triangular shaped gussets 66 welded to both plate 62 and box member 64. A removable cover 68 is provided which may be removed by disengaging nut and bolt 70. Removable cover 68 provides access to the interior of box member 64 for servicing of the components therein.

Lifting bag 72 is interposed between face 39 of lift plate 36 and backing plate 74 and is affixed to lift plate 36 on a conventional manner by bolts 73 that are inserted through bores 41 in lift plate 36. Lifting bag 72 is a commercially available, pneumatically operated bag. Pneumatic pressure to operate lifting bag 72 is provided through pneumatic line 76. Pneumatic line 76 is connected by suitable tubing to the vehicle air compressor.

The leading end of torque absorbing arm 28 is supported by bolt 80 which passes through central bore 35 of rubber bushing 34. Bolt 80 is supported at both of its ends by structural brackets 78 and retained in place by nut 81 threaded thereon, as best depicted in FIG. 4. Structural brackets 78 are welded into box member 64. Torque absorbing arm 28 extends rearward from bolt 80 to support axle 18. Conventional pressure lubrication fittings 82 are provided in the underside of sleeve 50 in order to lubricate the rotational interface between sleeve 50 and trailing arm 40.

Vertical load bearing air bag 84 is shown disposed between lower air bag support plate 54 and upper air bag support plate 86. Upper air bag support plate 86 is welded to plate 62 and is further supported by triangular gussets 88, welded to both plate 62 and upper air bag support plate 86. Upper air bag support plate 86 is supported in a outwardly directed cantilevered manner by plate 62 and is disposed at a generally right angle with respect to plate 62. The cantilevered disposition is best viewed in FIG. 4. where the outer portion of the vehicle is depicted at the top of the figure and the portion of the vehicle between frames 12 and 14 is depicted at the lower portion of the figure. Upper air bag support plate 86 is preferably located proximate the upper surface of frame 12 in order to provide the greatest travel possible for axle 18 such that axle 18 may be retracted to a position proximate the underside of frame 12.

Air bag 84 is a commercially available item. Air bag 84 is pneumatically operated with the pneumatic pressure being supplied through pneumatic inlet 90. Pneumatic inlet 90 is in turn connected by suitable tubing to the vehicle air compressor. Air bag 84 includes internal bellows 92, shown in the compressed position in phantom in FIG. 3 and in the extended position in the right suspension system 10 as shown in FIG. 1. Bellows 92 is typically formed of aluminum or other metal. Bellows 92 accommodates the extension of air bag 84 by deploying beneath air bag 84. Air bag 84 is held in fixed engagement in a conventional manner by upper and lower bolts 85. Lower bolts 85 are arranged to be inserted through bores 56, as depicted in FIG. 2.

In operation, auxiliary axle 18 is retained in its retracted position as depicted in FIG. 3 until the load being conveyed by the vehicle requires additional support. In its retracted position, wheels 20 and 22 are withdrawn out of contact with the surface over which the vehicle is operating. The fact that suspension system 10 is carried outboard of and along side of frames 12, 14, ensures that auxiliary axle 18 is drawn up to a height beneath frames 12, 14 that is high enough to ensure clearance over obstacles passing beneath the vehicle. The depiction of FIG. 5 shows the retracted suspension system 10 in the outboard relationship with respect to frame 12. To maintain auxiliary axle 18 in its fully retracted position, pneumatic pressure is continually provided to lift bag 72. Lift bag 72 acts on lift plate 36, creating a moment force about bolt 80 that pivots torque absorbing arm 28 and auxiliary axle 18 upward to the retracted position. To accomplish this, load bearing air bag 84 is in its relaxed condition, with no pneumatic pressure being applied. In this condition load bearing air bag 84 is free to compress in reaction to the moment created by lift bag 72.

When the load being conveyed by the vehicle warrants additional support, the vehicle operator can lower auxiliary axle 18 to a point in which wheels 20, 22 are in contact with the surface beneath the vehicle. Lowering is accomplished by releasing the pneumatic pressure in lift bag 72. The weight of axle 18 and wheels 20, 22 then cause torque absorbing arm 28 to pivot about bolt 80 and axle 18 will then descend in an arc until contact with the surface beneath the vehicle is achieved.

Vertical load bearing capability of auxiliary axle 18 is provided by load bearing air bag 84. To provide this capability load bearing air bag is inflated pneumatically to a selected pressure that is sufficient to bear the weight of the leaden vehicle. At a given pneumatic pressure, the flexibility of the exterior surface of load bearing air bag 84 and the extending and retracting motion of bellows 92 provide the compliance that permits auxiliary axle 18 to rise and fall beneath the vehicle responsive to the surface over which the vehicle is being operated. Load bearing air bag 84 expands and contracts responsive to such surface inputs to auxiliary axle 18.

The present invention accommodates the up and down motion of auxiliary axle 18 in which axle 18 maintains a generally parallel relationship to the bed of the vehicle. Such motion is depicted by arrow 24 in FIG. 1 and by the arrows designating pitch, −P and +P, in FIG. 2. In such motion wheels 20, 21 rise and fall together and the motion of torque absorbing arm 28 is pivotal about bolt 80 with the upwardly directed support force generated by such motion being absorbed generally equally by the load bearing air bag 84 of the left and the load bearing air bag 84 of the right suspension system 10.

In addition to accommodating such motion, suspension system 10 of the present invention additionally accommodates what can be described as rolling motion in a plane that is at right angles to the plane formed by the bed 16 of the vehicle. Such motion can be described as rotational motion of the axle 18 in such plane about a point at the center of the axle 18. Referring to FIG. 1, such rolling motion is depicted by arrows 26 and has raised wheel 20while at the same time lowering wheel 22. This motion is indicated as roll by arrows −R and +R in FIG. 2. This motion is translated to torque absorbing arm 28 simply as rotation of sleeve 50 about trailing tube 40. Effectively, this rotational motion is not translated to torque absorbing arm 28 as a torquing moment, but is absorbed simply as rotation of sleeve 50 about trailing arm 40. The fact that sleeve 50 rotates about trailing arm 40 prevents the generation of a torquing moment by the unequal up and down motion of axle 18. Suspension system 10 then has to accommodate only forces operating in the vertical plane as opposed to any twisting moments that may have been induced by the rotation of auxiliary axle 18.

By viewing the depiction in FIG. 1, it is apparent from arrows 26 that during rolling motion of auxiliary axle 18, the path of motion of the wheels 20, 22 during the rolling motion will define a slight arc. This slight arc motion is transmitted to torque absorbing arm 28 as indicated as yaw by arrows −Y and +Y in FIG. 2. The effects of this slight motion of torque absorbing arm 28 are absorbed by the compressibility of flexible bushing 34 that surrounds bolt 80.

There are various changes and modifications which may be made to the present invention as would be apparent to those skilled in the art. However, these changes and modifications are included in the teaching of the disclosure, and it is intended that the present invention be limited only by the scope of the claims appended hereto.

I claim:

1. A suspension system supporting an axle of a vehicle having a vehicle frame, the axle being disposed beneath the vehicle frame and having a wheel set at either end comprising:

a trailing arm having a leading portion pivotally coupled to the vehicle frame and a trailing portion, the trailing portion of the trailing arm having a cylindrical exterior surface; and bracket means for coupling the axle to the trailing arm, said bracket means being operably, fixedly coupled to the axle and operably, pivotally coupled to the trailing portion of the trailing arm, and having a cylindrical sleeve having an inside diameter slightly greater than the diameter of the cylindrical exterior surface of the trailing portion of the trailing arm, the sleeve being slid over the trailing portion of the trailing arm and in rotatable engagement therewith.

2. A suspension system as claimed in claim 1, further including:

spring means supporting the vehicle above the axle for providing compliance to permit axle motion relative to the vehicle, the spring means being disposed generally outboard of the vehicle frame and supported between a first plate operably coupled to the trailing arm and a second plate operably coupled to the vehicle frame.

3. A suspension system as claimed in claim 1, wherein the trailing arm pivots in a first plane and the bracket means pivots about the trailing portion of the trailing arm in a second plane responsive to axle motion relative to the vehicle frame, the first plane being generally transverse to the second plane.

4. A suspension system as claimed in claim 1, wherein a rolling motion of the axle relative to the vehicle frame as a result of the wheel sets operating over an uneven surface is transmitted to the suspension system substantially as a first rotational motion of the cylindrical sleeve of the bracket means about the cylindrical exterior surface of the trailing portion of the trailing arm and a second rotational motion of the trailing arm relative to the vehicle frame.

5. A suspension system as claimed in claim 2, wherein the second plate supporting the spring means is disposed outboard of the vehicle frame and affixed thereto, forming a cantilever therefrom, the spring means depending from the cantilevered second plate.

6. A suspension system supporting an axle of a vehicle having a vehicle frame, the axle having a wheel set at either end and disposed beneath the vehicle frame and being shiftable between a retracted position wherein the wheel sets are drawn up beneath the vehicle frame and are not in contact with the ground and a load bearing position wherein the wheel sets are extended and in contact with the ground, comprising:

first pivoting member means operably, pivotally coupled to the vehicle frame for selectively pivoting the axle between the retracted position and the load bearing position, having a cylindrical exterior surface, said first pivoting member being adapted for pivotally accommodating substantially vertical forces imposed on the wheel sets resulting from operation of the vehicle over the ground surface;

second pivoting member means for coupling the axle to the first pivoting member means, having a cylindrical sleeve with an inside diameter slightly greater than the diameter of the cylindrical exterior surface of the first pivoting member means, the sleeve being slid over the cylindrical exterior surface of the first pivoting member means and in rotatable engagement therewith said second pivoting member means being adapted for accommodating substantially rotational forces imposed on the wheel sets resulting from operation of the vehicle over the ground surface, the second pivoting member means being fixedly coupled to the axle and pivotally coupled to the first pivoting member means; and spring means for supporting the vehicle above the axle and for providing compliance to permit axle motion relative to the vehicle, the spring means being disposed generally outboard of the vehicle frame and supported by a first plate operably coupled to the first pivoting member means and a second plate operably coupled to the vehicle frame.

* * * * *